(12) United States Patent
Minnette

(10) Patent No.: US 9,056,409 B2
(45) Date of Patent: Jun. 16, 2015

(54) PROCESS FOR MOLDING A CLOSURE-SUPPORT RING OF A CONTAINER LID

(71) Applicant: Berry Plastics Corporation, Evansville, IN (US)

(72) Inventor: Jeffrey C Minnette, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 352 days.

(21) Appl. No.: 13/657,425

(22) Filed: Oct. 22, 2012

(65) Prior Publication Data

US 2013/0099414 A1    Apr. 25, 2013

Related U.S. Application Data

(60) Provisional application No. 61/550,073, filed on Oct. 21, 2011.

(51) Int. Cl.
*B29C 45/00* (2006.01)
*B29C 45/16* (2006.01)

(52) U.S. Cl.
CPC ..... *B29C 45/1642* (2013.01); *B29C 2045/0039* (2013.01)

(58) Field of Classification Search
CPC .................... B29C 45/164; B29C 2045/0039; B29C 45/1642; B29C 2045/0032
USPC .......................... 264/328.8, 328.12; 425/130
See application file for complete search history.

(56) References Cited

U.S. PATENT DOCUMENTS 6,062,840 A * 5/2000 Lee et al. ........................ 425/130
2005/0238486 A1 * 10/2005 Stagg et al. .................... 415/179

* cited by examiner

*Primary Examiner* — Jospeh S Del Sole
*Assistant Examiner* — Mohamed K Ahmed Ali
(74) *Attorney, Agent, or Firm* — Barnes & Thornburg LLP

(57) ABSTRACT

A process is disclosed for forming a brim-mount ring included in a container lid. The brim-mount ring is configured to mount on the brim of the container and to have a core made of a first material and a surrounding skin made of a second material

11 Claims, 7 Drawing Sheets

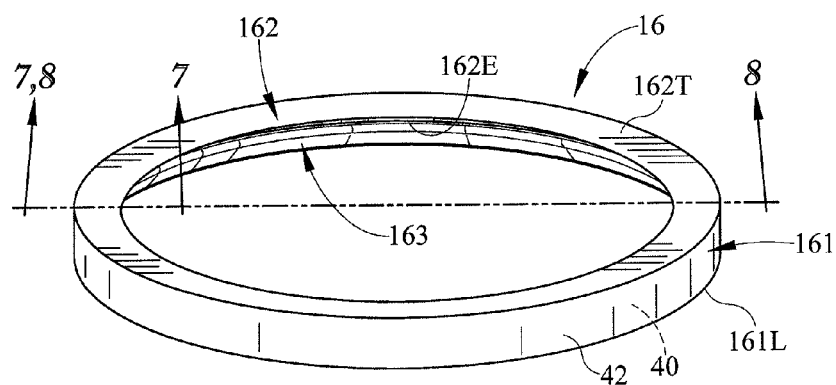
FIG. 5
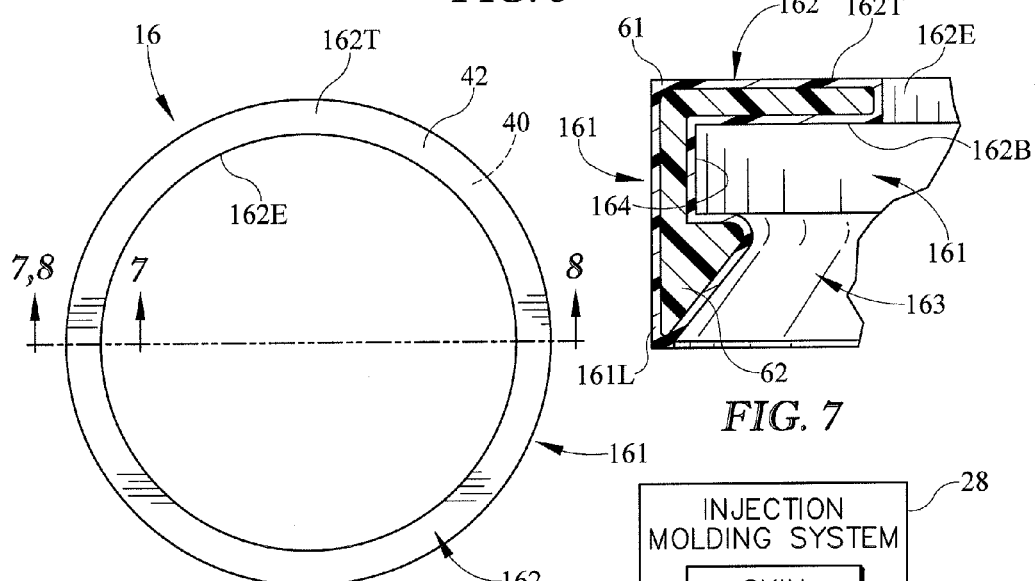
FIG. 6
FIG. 7
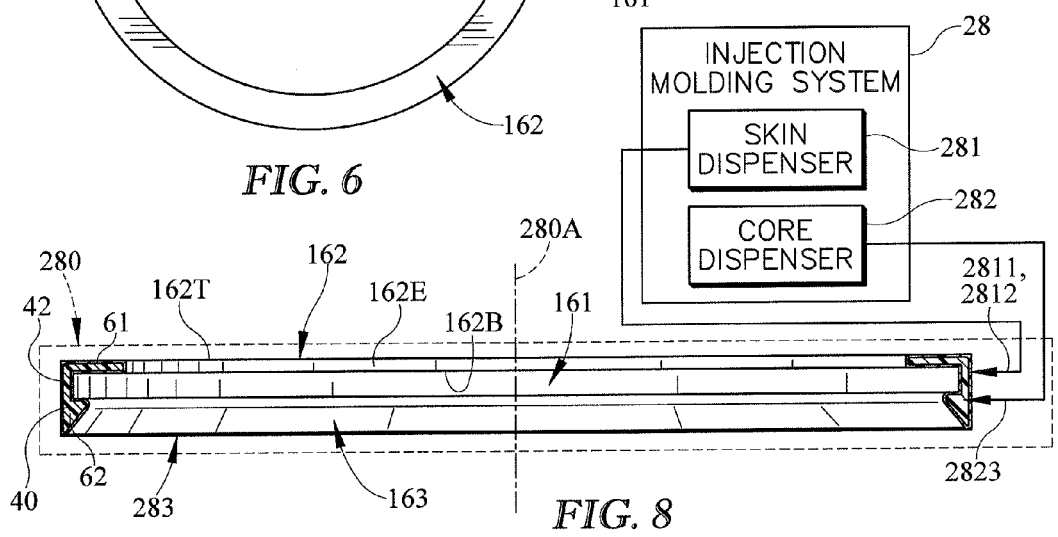
FIG. 8

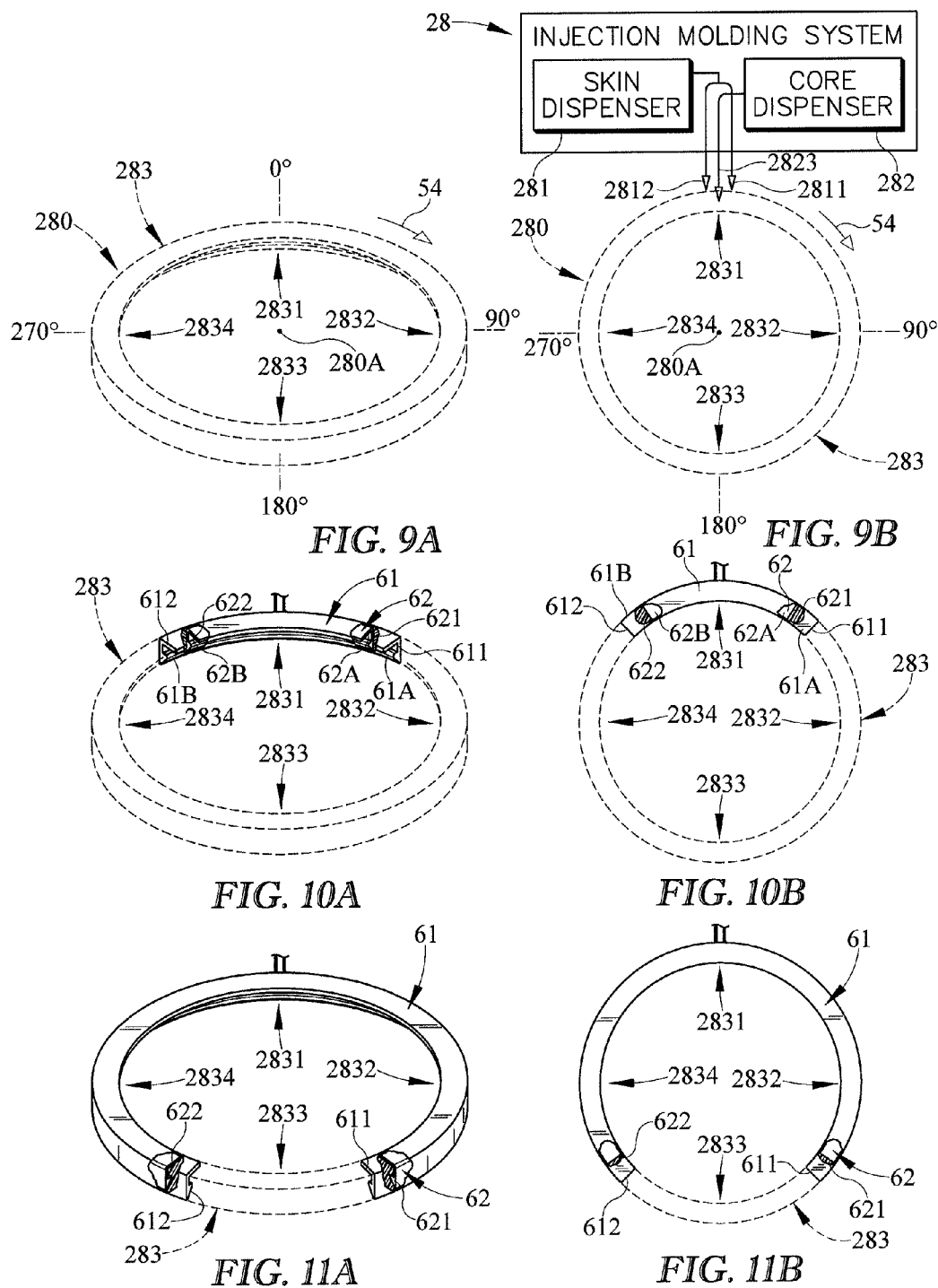

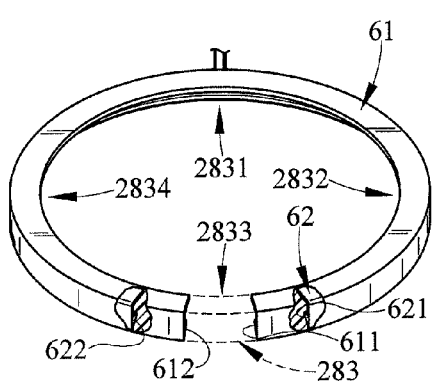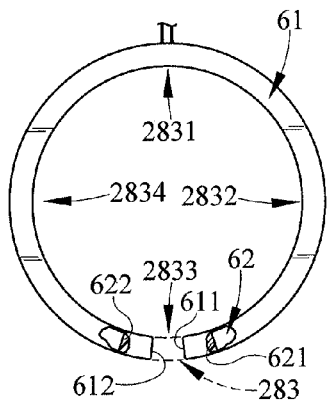
FIG. 12A  FIG. 12B
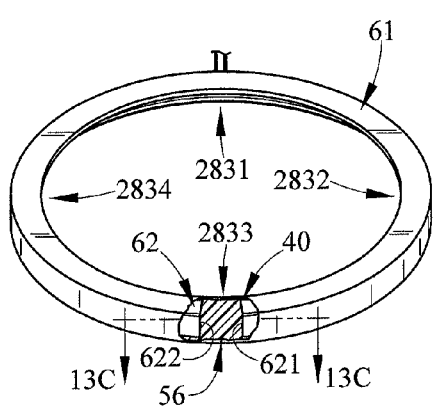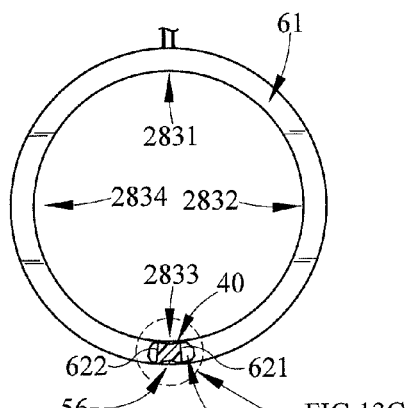
FIG. 13A  FIG. 13B
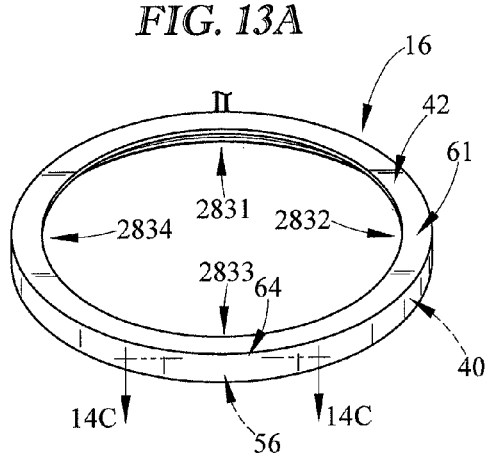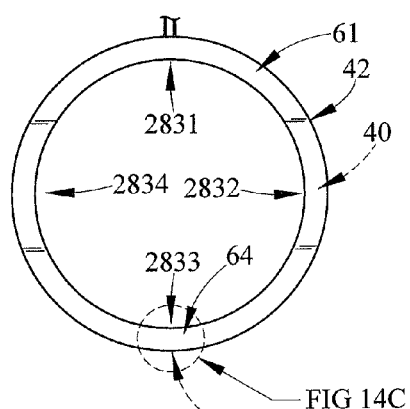
FIG. 14A  FIG. 14B

PROCESS FOR MOLDING A CLOSURE-SUPPORT RING OF A CONTAINER LID

CROSS REFERENCE TO RELATED APPLICATION

This application claims priority under 35 U.S.C. §119(e) to U.S. Patent Application Ser. No. 61/550,073 filed Oct. 21, 2011, the entirety of which is hereby incorporated herein by reference.

BACKGROUND

The present disclosure relates to a package, and in particular to a package including a container and a lid for the container. More particularly, the present disclosure relates to a package that can survive exposure to high temperatures and a process for molding a portion of a lid included in the package.

SUMMARY

According the present disclosure, a package comprises a lid and a container. The container includes a brim, a floor, and a side wall extending from the brim toward the floor. The side wall is coupled to the floor to define an interior region therein. The brim is coupled to the side wall to form a mouth opening into the interior region and the lid is coupled to the brim to close off the mouth and enclose the interior region.

In illustrative embodiments, the lid includes a closure-support ring and a removable closure. The closure-support ring is coupled permanently to the brim of the container. The removable closure is coupled temporarily to the closure-support ring and configured to be removed by a user without tools. The closure-support ring includes an inner core and an outer skin surrounding the inner core. The inner core is configured to provide means for blocking movement of oxygen and moisture between the interior region of the container and atmosphere outside the container.

In illustrative embodiments, the closure-support ring is made by an injection molding process in which a first plastics material is injected into a mold cavity formed in a mold to establish the outer skin and then a second plastics material is injected into the mold cavity to lie in a core space defined by the outer skin to establish the inner core. The first plastics material flows through the mold cavity ahead of the second plastics material until first and second skin melt fronts of the first plastics material join one another and merge. The second plastics material continues to flow through the core space formed in the first plastics material until first and second core melt fronts of the second plastics material overlap one another to establish an overlapping core knit line that provides means for establishing a substantially continuous oxygen-moisture barrier in the closure-support ring.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is a perspective view of the closure-support ring of FIG. 3;

FIG. 6 is a top plan view of the closure-support ring of FIG. 5;

FIG. 7 is a sectional view taken along line 7-7 of FIGS. 5 and 6 showing that the closure-support ring includes an outer skin made of a first plastics material and an inner core made a second plastics material formulated and configured to provide an oxygen-moisture transmission barrier;

FIG. 8 is a sectional view taken along line 8-8 of FIGS. 5 and 6 and a diagrammatic view showing that the inner core is provided by a core dispenser included in an injection molding system and that the outer skin is provided by a skin dispenser included in the injection molding system;

FIGS. 9A-14B are a series of views showing a molding process used to form the closure-support ring of FIGS. 4-6;

FIG. 9A is a perspective view of a mold cavity used to form the closure-support ring prior to injecting the first and second plastics materials into the mold cavity;

FIG. 9B is a to plan view and diagrammatic view of the mold cavity of FIG. 9A showing that the skin dispenser injects the first plastics material into the mold cavity to form a core space defined by the outer skin and that the core dispenser injects the second plastics material into the core space so that the inner core is surrounded by the outer skin;

FIG. 10A is a view similar to FIG. 9A showing that the molding process has begun and that the first plastics material has begun to flow outwardly from a first location at 0 degrees along a curved first path toward a second location at 90 degrees and along a curved second path toward a fourth location at 270 degrees and that the second plastics material has begun to flow inside the first plastics material toward the second and fourth locations in the mold cavity;

FIG. 10B is a view similar to FIG. 9B showing that the first plastics material continues to flow toward each of the second and fourth locations in the mold cavity while the second plastics material trails behind;

FIG. 11A is a view similar to FIG. 10A showing that as the molding process continues, the first plastics material continues to flow past the second and fourth positions in the mold cavity along the separate curved first and second paths toward the third position at 180 degrees in the mold cavity and that the second plastics material continues to flow inside the first plastics material;

FIG. 11B is a view similar to FIG. 10B showing that the first plastics material continues to flow toward the third location in the mold cavity while the second plastics material trails behind;

FIG. 12A is a view similar to FIG. 11A showing that as the molding process continues, the first plastics material continues to flow toward the third location in the mold cavity where a first skin melt front of the first plastics material joins a second skin melt front of the first plastics material as suggested in FIGS. 13A-C and that the second plastics material continues to flow in the core space formed in the outer skin and trail the first plastics material;

FIG. 12B is a view similar to FIG. 11B showing that the first plastics material is flowing towards the third location in the mold cavity and that the second plastics material continues to trail the first plastics material;

FIG. 13A is a view similar to FIG. 12A showing that the first and second skin melt fronts have joined together to establish a merged skin knit line at the third location in the mold cavity and that first and second core melt fronts of the second plastics material flow in the core space formed in the outer skin behind the first and second skin melt fronts toward the third location as suggested in FIGS. 14A and 14B;

FIG. 13B is a view similar to FIG. 12B showing that first and second skin melt fronts have joined together to establish the merged skin knit line;

FIG. 14A is a view similar to FIG. 13A with portions broken away to reveal that the first and second core melt fronts have moved through the first and second skin melt fronts to establish the overlapping core knit line;

FIG. 14B is a view similar to FIG. 13B showing that the first and second core melt fronts have joined together to establish the overlapping core knit line.

DETAILED DESCRIPTION

Figures 1, 2:
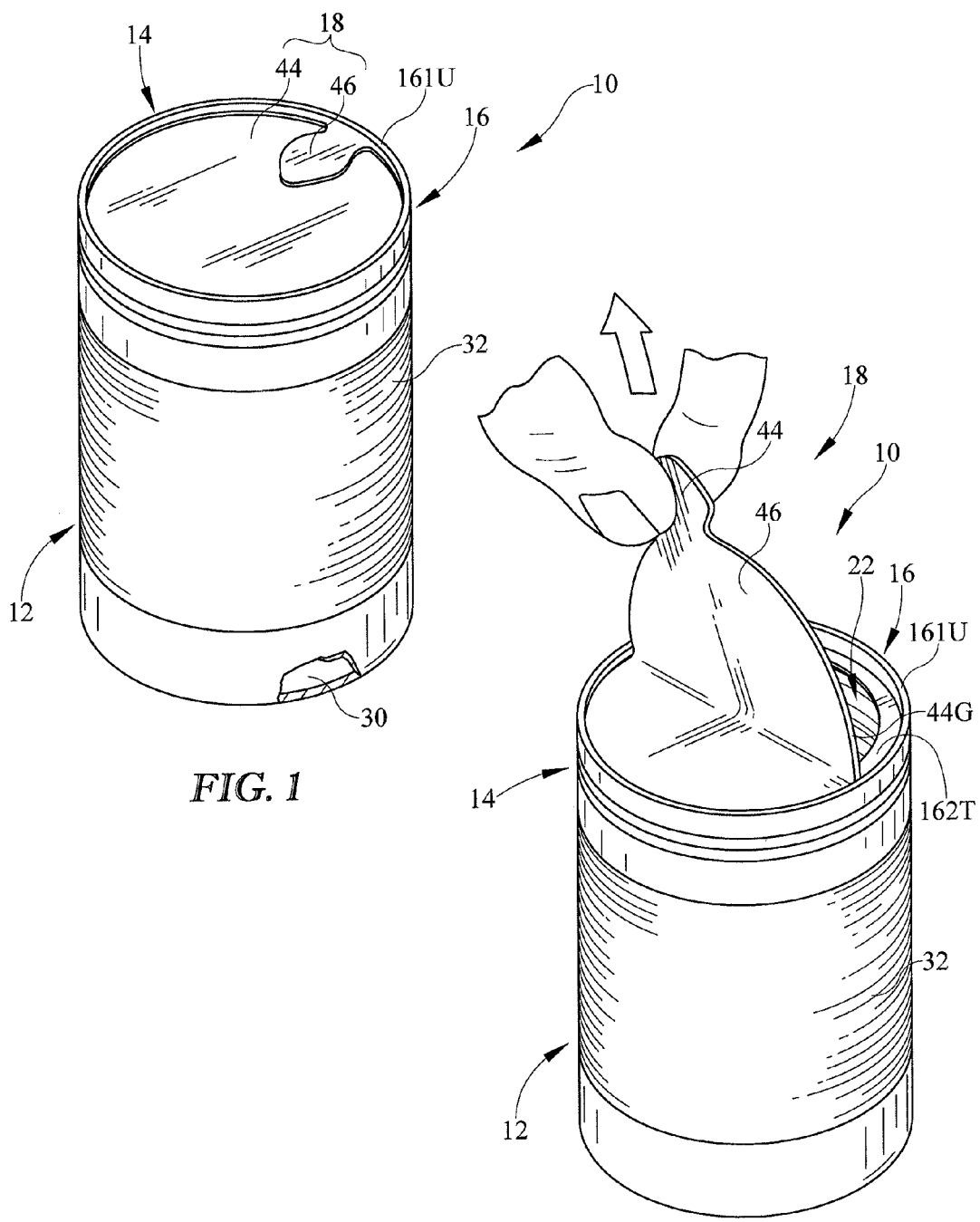
FIG. 1 is a perspective view of a package showing a lid in accordance with the present disclosure mounted on an underlying container to close a mouth opening into an interior region formed in the container.
FIG. 2 is a perspective view similar to FIG. 1 showing that a removable closure included in the lid and coupled to a closure-support ring that is coupled to the brim of the container can be removed by a consumer to gain access to product stored in the interior region of the container without removing the closure-support ring from the container brim.

A package 10 in accordance with the present disclosure includes a container 12 and a lid 14 configured to mount on container 12 as suggested in FIGS. 1 and 2. In illustrative embodiments, each of container 12 and lid 14 is comprised only of plastics materials that can survive exposure to high temperatures associated with, for example, a package heating or sterilization process. Lid 14 includes, for example, a closure-support ring 16 configured to mount on a container 12 and a removable closure 18 coupled to closure-support ring 16 to enclose a product-storage region 22 formed in container 12. Closure-support ring 16 included in lid 14 includes an inner core 24 made, for example, of an oxygen and moisture impermeable plastics material and an outer skin 26 made of a different plastics material as shown in FIG. 7. Closure-support ring 16 is made using an injection molding process as shown in FIGS. 9A-14C.

Figure 3:
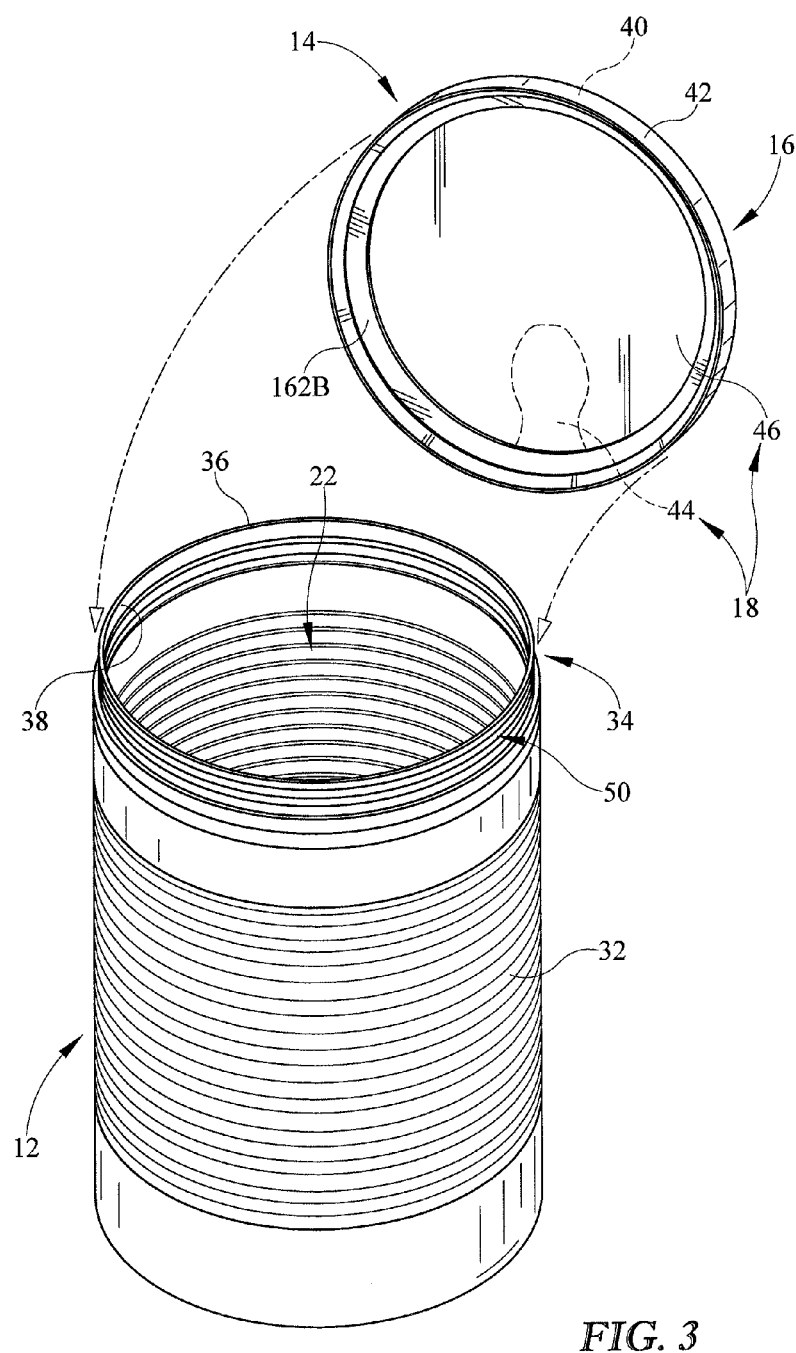
FIG. 3 is an exploded perspective assembly view of the components of the package of FIG. 1 showing the lid before it is mounted on the brim of the container.

Container 12 includes a floor 30 and a side wall 32 extending upwardly from a perimeter edge of floor 30 and terminating at a container brim 34 as shown, for example, in FIGS. 1-3. Floor 30 and side wall 32 cooperate to form interior product-storage region 22 in container 12. Container brim 34 includes an upwardly facing lid-receiving surface 36 and is formed to include an inner edge 38 defining a mouth opening into product-storage region 22 formed in container 12 as suggested in FIGS. 1 and 2. It is within the scope of this disclosure to provide container 12 with any suitable size and shape.

Lid 14 includes closure-support ring 16 configured to mount permanently on container brim 34 of container 12 and a removable closure 18 configured to mount temporarily on closure-support ring 16 until it is removed by a consumer to gain access to product-storage region 22 as shown, for example, in FIG. 2. When lid 14 is mounted on container 12 at a factory as suggested in FIG. 1, closure-support ring 16 is coupled to container brim 34 to establish a sealed connection therebetween. However, it is within the scope of the present disclosure to include a seal in the lid which is positioned between the closure-support ring and the container brim to establish the sealed connector.

Closure-support ring 16 includes inner core 40 made of one plastics material and outer skin 42 made of another plastics material as shown in FIGS. 7-14C. During the injection molding process, a first plastics material 61 is injected so as to surround an inner core 40 made of a second plastics material 62 as shown in FIGS. 8-14C. During installation of lid 14 on container 12, closure-support ring 16 is snapped on container brim 34 so that a portion of outer skin 42 is trapped between inner core 40 and container brim 34. As an example, inner core 40 is made from a second plastics material 62 that is configured to act as a moisture and oxygen barrier and outer skin 42 is made from a first plastics material 61. During the injection molding processing accordance with the present disclosure, inner core 40 is formed to include an overlapping core knit line 56 that is configured to provide means for establishing a substantially continuous inner core 40 that does not contain any radially extending gap therein so that a substantially continuous oxygen-moisture barrier is establish in closure-support ring 16.

Removable closure 18 includes a membrane sheet 44 and a pull tab 46 coupled to membrane sheet 44 in an illustrative embodiment as suggested in FIGS. 1-4. A consumer can gain access to product stored in product-storage region 22 formed in container 12 by separating removable closure 18 from closure-support ring 16 as suggested in FIG. 2. In an illustrative embodiment, the consumer grips and pulls upwardly on pull tab 46 to cause membrane sheet 44 to be peeled away from closure-support ring 16 as suggested in FIG. 2. Removable closure 18 is made of a plastics material able to withstand exposure to high temperatures associated with package sterilization. Removable closure 18 can fracture to provide easy peel.

Closure-support ring 16 has a size and shape selected to match and mate with container brim 34. Closure-support ring 16 is round in the illustrated embodiment. It is within the scope of this disclosure to provide closure-support ring 16 with a rectangular, square, oval, or other suitable shape selected to mate with a companion container brim.

Closure-support ring 16 includes an axially extending annular side wall 161 and a radially inwardly extending inner rim 162 coupled to an inwardly facing surface 164 of annular side wall 161 as suggested in FIG. 7. Closure-support ring 16 also includes an annular retention band 163 coupled to a lower portion 161L of annular side wall 161 as suggested in FIGS. 4, 5, 7, and 8. As an example, annular retention band 163 is arranged to extend into retention-band receiver 50 formed in container brim 34 when lid 14 is coupled to container 12.

Annular side wall 161 of closure-support ring 16 may further include an annular upper portion 161U coupled to lower portion 161L and arranged to extend upwardly above inner rim 162 of closure-support ring 16 as shown, for example, in FIGS. 1 and 2. Annular upper portion 161U is arranged to extend around an outer perimeter edge 44E of membrane sheet 44 when membrane sheet 44 is coupled to inner rim 162 as suggested in FIGS. 1 and 2.

Figure 4:
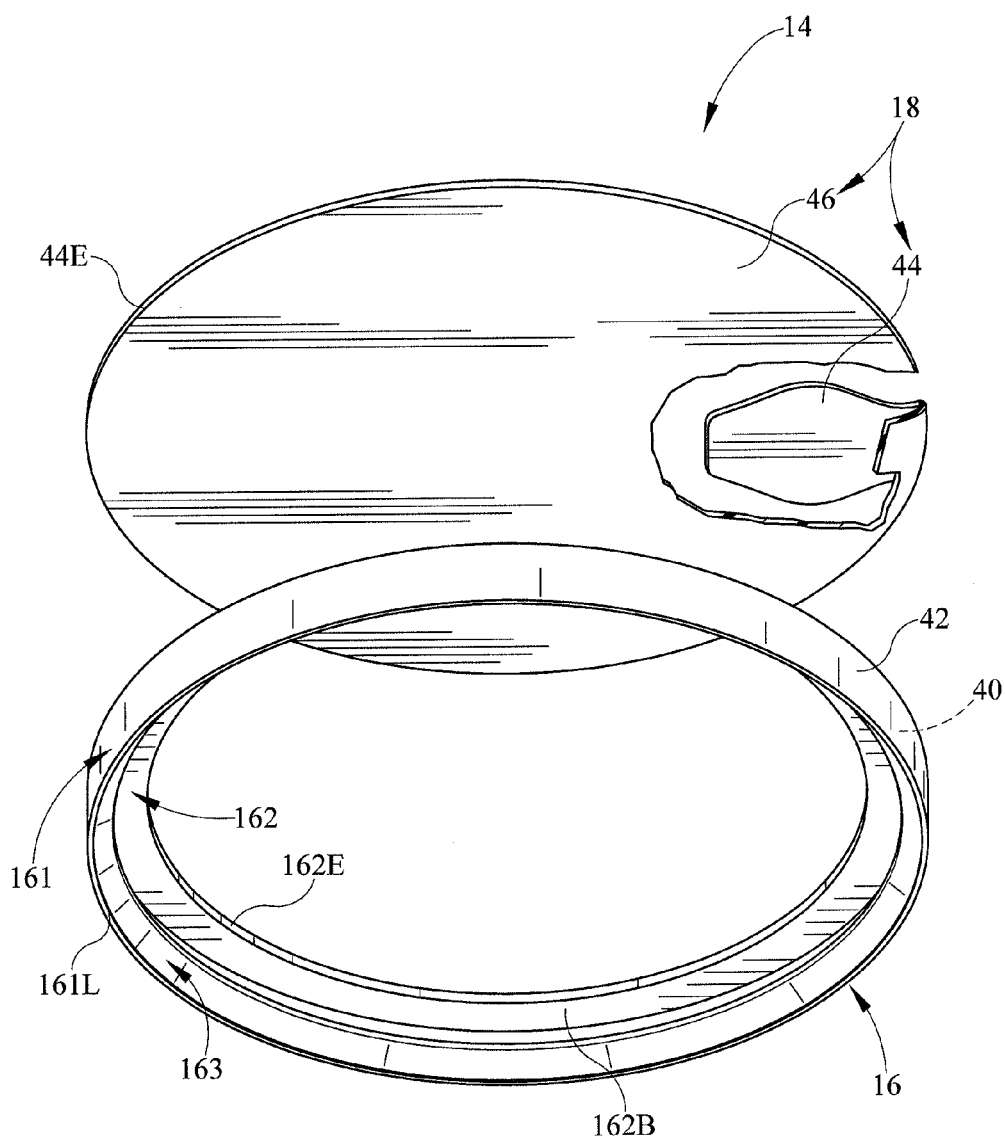
FIG. 4 is an exploded perspective assembly view of components of the lid of FIG. 1 showing, in series, from top to bottom, the removable closure including a membrane sheet and a pull tab coupled to the membrane sheet and the closure-support ring adapted to mate permanently with the brim of the container shown in FIG. 3 and carry the membrane sheet of the removable closure as suggested in FIG. 2.

Inner rim 162 of closure-support ring 16 includes a radially outer portion coupled to annular side wall 161 and a radially inner edge 162E formed to define an aperture opening into the product-storage region 22 formed in container 12 as shown, for example, in FIG. 4. Inner rim 162 includes a top surface 162T coupled to a downwardly facing surface of membrane sheet 44 as shown, for example, in FIG. 2. Membrane sheet 44 can be welded to top surface 162T of inner rim 162 during package forming. Inner rim 162 also includes a bottom surface 162B coupled to an upwardly facing surface of container brim 34 as also suggested in FIG. 3.

Closure-support ring 16 is made, for example, using the injection molding process disclosed herein as suggested diagrammatically in FIG. 8. The injection molding process is performed on an injection molding system 28 as suggested diagrammatically in FIGS. 8 and 9B. As an example, the injection molding system may be a co-injection molding process. Injection molding system 28 includes a skin dispenser 281, a core dispenser 282, and a mold 280 formed to include a ring-shaped mold cavity 283 as suggested diagrammatically in FIGS. 8, 9A, and 9B. The mold 280 is further formed to include first, second, and third gates 2811, 2812, 2823. The first and second gates 2811, 2812 are coupled to the skin dispenser 281 and are configured to inject first plastics material 61 into mold cavity 283. The third gate 2823 gate 2811 is coupled to core dispenser 282 and configured to inject second plastics material 62 into a core space 241 formed by first plastics material 61 forming outer skin 26 as suggested in FIGS. 8-14C. As suggested in FIG. 9B, third gate 2823 associated with second plastics material 62 is positioned to lie between first and second 2811, 2812 that are associated with first plastics material 61.

As shown in FIGS. 9A and 9B, ring-shaped mold cavity 283 is configured to have four locations 2831, 2832, 2833, and 2834. First location 2831 is defined to be at 0 degrees of travel in a clockwise direction 54 around a circumference of ring-shaped mold cavity 283 and where first, second, and third gates 2811, 2822, 2823 are coupled to mold 280 to inject first and second plastics materials 61, 62 into ring-shaped mold cavity 283. Second location 2832 is defined to be at 90 degrees of travel in clockwise direction 54 around the circumference of ring-shaped mold cavity 283. Third location 2833 is defined to be at 180 degrees of travel in clockwise direction 54 around the circumference of ring-shaped mold cavity 283. Fourth location 2834 is defined to be at 270 degrees of travel in clockwise direction 54 around the circumference of ring-shaped mold cavity 283 as shown in FIGS. 9A and 9B.

During an illustrative injection molding process in accordance with the present disclosure, injection molding system 28 begins by injecting first plastics material 61 through first and second gates 2811, 2812 located at first location 2831 into ring-shaped mold cavity 283 using skin dispenser 281 as shown diagrammatically in FIG. 9B. As first plastics material 61 enters ring-shaped mold cavity 283, leading first and second skin melt fronts 611, 612 are established. As an example, leading first skin melt front 611 of first plastics material 61 moves away from first location 2831 toward second location 2832 and leading second skin melt front 612 of first plastics material 61 moves away from first location 2831 toward fourth location 2834 as shown in FIGS. 10A, 10B.

Just after skin dispenser 281 begins injecting first plastics material 61 into mold cavity 52, core dispenser 282 injects second plastics material 62 through third gate 2823 located at first location 2831. As second plastics material 62 enters ring-shaped mold cavity 283, leading first and second core melt fronts 621, 622 are established. As an example, first core melt front 621 of second plastics material 62 flows through first plastics material 61 away from first location 2831 toward second location 2832 just behind first skin melt front 611. At the same time, second core melt front 622 of second plastics material 62 flows through first plastics material 61 away from first location 2831 toward fourth location 2834 just behind second skin melt front 612 as shown in FIGS. 10A and 10B.

As the injection molding process continues, first and second skin melt fronts 611, 612 move past second and fourth locations 2832, 2834 toward third location 2833 as shown in FIGS. 11A and 11B. First and second core melt fronts 621, 622 have also moved past second and fourth locations 2832, 2834 toward third location 2833 just behind first and second skin melt fronts 611, 612.

After additional time in the injection molding process, first and second skin melt fronts 611, 612 continue to move toward third location 2833 as shown in FIGS. 12A, 12B. First and second core melt fronts 621, 622 continue to trail behind first and second skin melt fronts 611, 612 so that first and second skin melt fronts 611, 612 may come together and merge with one another at third location 2833 and establish merged skin knit line 64 as shown in FIGS. 13A-13C.

Figure 13C:
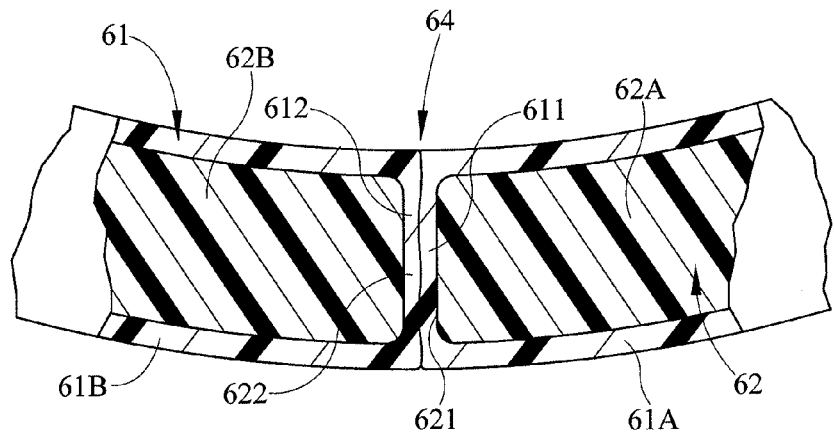
FIG. 13C is an enlarged sectional view taken along the line 13C-13C of FIG. 13A showing that the first and second skin melt fronts have joined together establishing the merged skin knit line and that the first and second core melt fronts are moving toward one another as suggested in FIGS. 13D-14C.

As the injection molding process nears completion, first and second core melt fronts 621, 622 come together at third location 2833 as shown in FIGS. 13A-13C. First core melt front 621 is configured to overlap with second core melt front 622 to establish overlapping core knit line 56. In an illustrative embodiment, these core melt fronts 621, 622 co-mingle. Overlapping core knit line 56 is configured to provide means for establishing a substantially continuous inner core 40 that does not contain any radially extending gap between first and second core melt fronts 621, 622 so that a substantially continuous oxygen-moisture barrier is established in closure-support ring 16. As shown in FIG. 13C, first and second skin melt fronts 611, 612 are configured to lead first and second core melt fronts 621, 622 so that sufficient time is available to allow overlapping core knit line 56 to be established without interference from first and second skin melt fronts 611, 612.

Figure 13D:
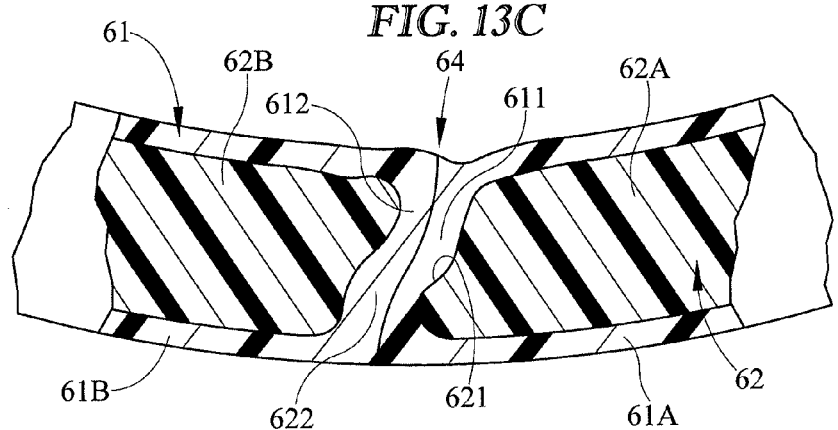
FIG. 13D is a view similar to FIG. 13C showing that the first and second core melt fronts have begun to push through the first and second skin melt fronts and overlap one another to establish an overlapping core knit line so that a continuous inner core is produced as shown in FIGS. 14A-14C.
Figure 14C:
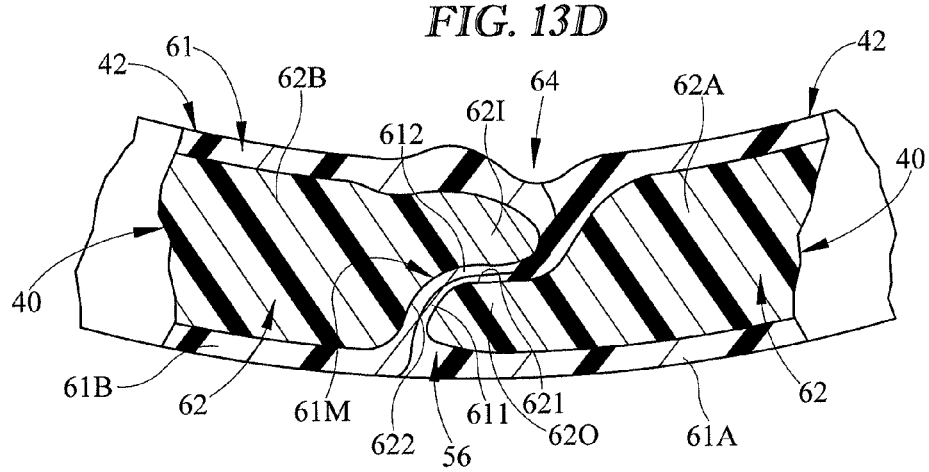
FIG. 14C is an enlarged sectional view taken along the line 14C-14C of FIG. 14A showing that the first and second core melt fronts have moved through the first and second skin melt fronts to overlap one another and establish the overlapping core knit line.

The injection molding process is complete when first and second core melt fronts 621, 622 come together at third location 2833 as shown in FIGS. 14A-14C. As a result, inner core 40 is completely surrounded by first plastics material 61 causing outer skin 42 to be formed. As shown in FIG. 13D, first and second skin melt fronts 611, 612 may be trapped between first and second core melt fronts 621, 622. As a result of first and second core melt fronts 621, 622 establishing overlapping core knit line 56, first and second skin melt fronts are thinned and slanted. Once overlapping core knit line 56 is established, a straight radial path through inner core 40 by way of slanted first and second skin melt fronts 611, 612 is blocked.

Package 10 is a high-temperature retortable barrier package configured to seal contents under high-temperature and high-pressure sterilization and microwave cooking and does not allow transmission of oxygen or moisture in accordance with illustrative embodiments. Second plastics material 62 may be used with first plastics material 61 to minimize an amount of first plastics material 61 used to form closure-support ring 16. As a result, material costs may be minimized.

As suggested in FIGS. 8-14, a process is disclosed for molding a closure-support ring 16 included in a container lid 14. Closure-support ring 16 is adapted to support a closure 18 to form lid 14 and to mate with a brim 34 of a container 12 to close a mouth 38 opening into a product-storage region 22 formed in a container 12.

The ring-molding process disclosed herein comprises the steps of providing a ring-shaped mold cavity 283 and injecting a second plastics material 62 into ring-shaped mold cavity 283 after a first plastics material 61 has been injected into ring-shaped mold cavity 283 so that the second plastics material 62 forms on an annular core 40 that is surrounded by an annular skin 42 (or cover) formed by the first plastics material as suggested in FIG. 9-14. In illustrative embodiments, using the process disclosed herein the annular core 40 defined by the second plastics material 62 is formed in the ring-shaped mold cavity 283 after formation of the annular skin 42 defined by the first plastics material 61 as suggested in FIGS. 13 and 14.

Ring-shaped mold cavity 283 is formed in a mold 280 to surround a central axis 280A of mold 280 as suggested in FIGS. 8 and 9. Ring-shaped mold cavity 283 is shaped to form a closure-shaped ring 16 when filled with first and second plastics materials 61, 62 as suggested in FIGS. 8 and 14.

In a first injecting step in accordance with the present disclosure, first plastics material 61 is injected into ring-shaped mold cavity 283 at a first location 2831 to divide first plastics material 61 into an outer first stream 61A having a first skin melt front 611 and an outer second stream 61B having a second skin melt front 612 as suggested in FIGS. 10A and 10B. Outer first stream 61A of first plastics material 61 is caused to flow in a clockwise direction along a curved first path in a ring-shaped mold cavity 283 toward a third location 2833 provided in ring-shaped mold cavity 283 as suggested in FIGS. 10-13. Outer second stream 62A of first plastics material 62 is caused to flow in a counter clockwise direction along a curved second path in ring-shaped mold cavity 283 toward third location 2833. In illustrative embodiments, first and third locations 2831, 2833 cooperate to establish a diameter of ring-shaped mold cavity 283 passing through central axis 280A as suggested in FIGS. 9A and 9B.

In a second injection step in accordance with the present disclosure, a second plastics material 62 is injected into ring-shaped mold cavity 283 at first location 2831 after the first injecting step as suggested in FIGS. 9 and 10, the second injecting step takes place while outer first and second streams 61A, 61B of first plastics material are already flowing along the separate curved first and second paths provided in ring-shaped mold cavity 283 toward the third location 2833.

In the second injecting step disclosed herein, second plastics material 62 is divided into an inner first stream 62A having a first core melt front 621 and an inner second stream 62B having a second core melt front 622 as suggested in FIGS. 10A and 10B. Inner first stream 62A of second plastics material 62 is caused to trail outer first stream 61A of first plastics material 61 and to flow along the curved first path in the clockwise direction in a channel formed in outer first stream 61A of first plastics material 61 as suggested in FIGS. 10-13 as outer first stream 61A of first plastics material 61 flows from first location 2831 to third location 2833 in ring-shaped mold cavity 283 of mold 280. Inner second stream 62B of second plastics material 62 is caused to flow separately from inner first stream 61A of second plastics material 62 to trail outer stream 61B of first plastics material 61 as outer second stream 61B of first plastics material 61 flows from first location 2831 to third location 2833 in ring-shaped mold cavity 283 of mold 280.

In a subsequent merging step shown, for example, in FIGS. 14A-14C, leading skin melt front 611 of outer first stream 16A of first plastics material 61 moving along the curved first path in ring-shaped mold cavity 283 is merged with a leading skin melt front 612 of outer second stream 61B of first plastics material 61 moving along the curved second path in ring-shaped mold cavity 283. Such a merger establishes a merged skin knit line in ring-shaped mold cavity 183 as suggested diagrammatically in FIGS. 14A-14C.

In a subsequent overlapping step, a leading core melt front 621 of inner first stream 62A of second plastics material 62 moving along the curved first path is caused to overlap a leading core melt front 622 of inner second stream 62B of second plastics material 62 moving along the curved second path to lie in close proximity to one another after the merging step as suggested in FIG. 13C. As the overlapping step continues, first plastics material 61 extant between leading core melts fronts 621, 622 of inner first and second streams 62A, 62B is displaced as suggested in FIGS. 13D and 14C owing to movement of leading core melts fronts 621, 622 toward one another. Such movement causes alignment of leading core melt fronts 621, 622 of inner first and second streams 62A, 62B of second plastics material 62 in radially overlapping relation so that one of leading core melt fronts (e.g. 622) lies between central axis 280A of mold 280 and the other of leading core melt fronts (e.g., 621).

In an illustrative embodiment, the leading core melt fronts 621, 622 of inner first and second streams 62A, 62B of second plastics material 62 overlap in third location 2833 in ring-shaped mold cavity 283 to establish an overlapping core knit line shown diagrammatically in FIG. 14C to establish substantially continuous inner core 40 made of second plastics material 62 inside an outer skin 42 made of first plastics material 61 so that a substantially continuous oxygen-moister barrier defined by second plastics material is established in closure-support ring 16. In illustrative embodiments, the outer skin 42 provided by first plastics material 61 is continuous and provides an annular skin or sheath 40 surrounding the substantially continuous inner core 40. In illustrative embodiments, portions of the skin melt fronts 611, 612 of outer first and second streams 61A, 61B of first plastics material 61 are trapped as suggested in FIG. 14C between overlapping portions of core melt fronts 621, 622 of inner first and second streams 62A, 62B of second plastics material 62 to establish a circumferentially extending portion 61M of first plastics material lying between overlapping portions of core melt fronts 621, 622 to establish means for blocking flow of oxygen through closure-support ring 16 formed in ring-shaped mold cavity 283 along a straight radial path. As suggested in FIG. 14C, a circumferentially extending tubular portion 61M of first plastics material 61 is positioned to lie in a space provided between overlapping tubular portions 62I and 62O of second plastics material 62 forming inner core 42.

The invention claimed is:

1. A process for molding a closure-support ring that is adapted to mate with a brim of a container and with a closure to form a lid configured to close a mouth opening into an interior region formed in the container when the closure-support ring is mated with the brim and the closure is mated with the closure-support ring, the process comprising the steps of providing a ring-shaped mold cavity formed in a mold to surround a central axis of the mold and sized and shaped to form the closure-support ring when filled with plastics materials, first injecting a first plastics material into the ring-shaped mold cavity at a first location to divide the first plastics material into outer first and second streams and to cause the outer first stream of the first plastics material to flow in a clockwise direction along a first path in the ring-shaped mold cavity toward a third location that is provided in the ring-shaped mold cavity and arranged to cooperate with the first location to establish a diameter of the ring-shaped mold cavity and to cause the outer second stream of the first plastics material to flow separately from the outer first stream in a counterclockwise direction along a second path in the ring-shaped mold cavity toward the third location, second injecting a second plastics material into the ring-shaped mold cavity at the first location after the first injecting step and while the outer first and second streams of the first plastics materials are flowing along separate first and second paths in the ring-shaped mold cavity from the first location toward the third location to divide the second plastics material into inner first and second streams and to cause the inner first stream of the second plastics material to trail the outer first stream of the first plastics material and to flow along the first path in the clockwise direction in a channel formed in the outer first stream of the first plastics material as the outer first stream of the first plastics material flows from the first location to the third location and to cause the inner second stream of the second plastics material to flow separately from the inner first stream of the second plastics material to trail the outer second stream of the first plastics material and to flow along the second path in a channel formed in the outer second stream of the first plastics material as the outer second stream of the first plastics material flows from the first location to the third location, merging a leading skin melt front of the outer first stream of the first plastics material moving along the first path and a leading skin melt front of the outer second stream of the first plastics material moving along the second path in the mold cavity to establish a merged skin knit line in the ring-shaped mold cavity, and overlapping a leading core melt front of the inner first stream of the second plastics material moving along the first path and a leading core melt front of the inner second stream of the second plastics material moving along the second path to lie in close proximity to one another after the merging step to displace any of the first plastics material extant between the leading core melt fronts of the inner first and second streams of the second plastics material and to align the leading core melt fronts of the inner first and second streams of the second plastics material in radially overlapping relation so that one of the leading core melt fronts lies between the central axis of the mold and the other of the leading core melt fronts.

2. The process of claim 1, wherein the leading core melt fronts of the inner first and second streams of the second plastics material cooperate in the mold cavity to establish an overlapping core knit line to establish a substantially continuous inner core made of the second plastics material inside an outer skin made of the first plastics material so that a substantially continuous oxygen-moister barrier defined by the second plastics material is established in the closure-support ring.

3. The process of claim 2, wherein a circumferentially extending tubular portion of the first plastics materials is positioned to lie in a space provided between overlapping portions of the second plastics material forming the inner core.

4. The process of claim 2, wherein the outer skin is continuous and provides an annular sheath surrounding the continuous inner core.

5. The process of claim 1, wherein the merging step takes place at about the third location in the ring-shaped mold cavity.

6. The process of claim 5, wherein the overlapping step also takes place at about the third location in the ring-shaped mold cavity.

7. The process of claim 6, wherein the core melt fronts of the inner and outer first and second streams of the second plastics material cooperate in the mold cavity to establish an overlapping core knit line to establish a substantially continuous inner core made of the second plastics material inside an outer skin made of the first plastics material so that a substantially continuous oxygen-moister barrier defined by the second plastics material is established in the closure-support ring.

8. The process of claim 7, wherein the outer skin is continuous and provides an annular sheath surrounding the substantially continuous inner core.

9. The process of claim 1, wherein portions of the skin melt fronts of the outer first and second streams of the first plastics material are trapped between overlapping portions of the core melt fronts of the inner first and second streams of the second plastics material to establish a circumferentially extending portion of first plastics material lying between overlapping portions of the core melt front to establish means for blocking flow of oxygen through the closure-support ring formed in the ring-shaped mold cavity along a straight radial path.

10. A process for molding a closure-support ring that is adapted to mate with a brim of a container and with a closure to form a lid configured to close a mouth opening into an interior region formed in the container when the closure-support ring is mated with the brim and the closure is mated with the closure-support ring, the process comprising the steps of injecting a first plastics material into a mold cavity formed in a mold to establish an annular outer skin of the closure-support ring, injecting a second plastics material into the mold cavity to lie in a core space defined by the outer skin to establish an annular inner core surrounded by the annular outer skin, allowing the first plastics material to flow in the mold cavity ahead of the second plastics material until separate leading first and second skin melt fronts of the first plastics material join one another and merge, and allowing the second plastics material to continue to flow through the core space formed in the first plastics material until leading first and second core melt fronts of the second plastics material overlap one another to establish an overlapping core knit line that provides means for establishing a substantially continuous inner core made of an oxygen- and moisture transmission barrier material so that a substantially continuous annular oxygen-moisture barrier is established in the closure-support ring.

11. The process of claim 10, wherein the closure-support ring is coupled to a closure to form a container lid, the closure-support ring is coupled permanently to a brim of a container to form a package, and the closure is coupled temporarily to the closure-support ring and configured to be removed from the closure-support ring without use of tools.

* * * * *